United States Patent
Doyle

(10) Patent No.: US 9,074,686 B2
(45) Date of Patent: Jul. 7, 2015

(54) RING SEAL RETAINER ASSEMBLY AND METHODS

(71) Applicant: Microflex Technologies LLC, Anaheim, CA (US)

(72) Inventor: Gregory M. Doyle, Orange, CA (US)

(73) Assignee: Microflex Technologies LLC, Anaheim, CA (US)

( * ) Notice: Subject to any disclaimer, the term of this patent is extended or adjusted under 35 U.S.C. 154(b) by 0 days.

(21) Appl. No.: 13/910,294

(22) Filed: Jun. 5, 2013

(65) Prior Publication Data
US 2013/0264778 A1 Oct. 10, 2013

Related U.S. Application Data

(63) Continuation-in-part of application No. PCT/US2011/063429, filed on Dec. 6, 2011, and a continuation-in-part of application No. 13/312,156, filed on Dec. 6, 2011.

(60) Provisional application No. 61/420,268, filed on Dec. 6, 2010.

(51) Int. Cl.
*F16J 15/02* (2006.01)
*B23P 11/02* (2006.01)
(Continued)

(52) U.S. Cl.
CPC .......... *F16J 15/022* (2013.01); *Y10T 29/49826* (2015.01); *B23P 11/02* (2013.01); *F16J 15/0887* (2013.01); *F16L 23/20* (2013.01); *F16J 15/061* (2013.01)

(58) Field of Classification Search
CPC ......... F16J 15/022; F16J 15/06; F16J 15/061; F16J 15/062; F16J 15/08; F16J 15/0806; F16J 15/0881; F16J 15/0887; F16J 15/0893

USPC ................ 277/602, 604, 608, 612, 626, 584; 285/380, 336, 328, 38, 422, 910, 917, 285/379

See application file for complete search history.

(56) References Cited

U.S. PATENT DOCUMENTS

| 906,761 A | 12/1908 | White |
| 1,821,865 A | 9/1931 | Wilson |

(Continued)

FOREIGN PATENT DOCUMENTS

| EP | 1455121 | 9/2004 |
| JP | 2010096329 | 4/2010 |
| WO | 8903495 | 4/1989 |

OTHER PUBLICATIONS

Nickitas-Etienne, A.; "International Preliminary Report on Patentability and the Written Opinion of the International Searching Authority"; Apln. No. PCT/US2011/063447; dated Jun. 20, 2013; 6 pages.

(Continued)

*Primary Examiner* — Gilbert Lee
(74) *Attorney, Agent, or Firm* — Fitch, Even, Tabin & Flannery LLP

(57) ABSTRACT

An example sealing system includes a retainer for a gasket wherein the retainer protects the polished sealing surface of the seal gasket from scratches before assembly by suspending the gasket inside the retainer, regardless of orientation. A gap in the circumference of the retainer allows the retainer to flex open for insertion of the seal gasket. A small chamfer on the inner diameter of the retainer aids the insertion of the seal into the retainer. The gap in the circumference of the retainer also allows the retainer to compress to a smaller circumference for a tight fit inside the sealing counterbore. A groove in the inner diameter of the retainer includes a protruding portion for the seal to engage. The depth of this groove is configured to provide some clearance inside the retainer for the protruding edge of the seal during a complete compression of the retainer.

44 Claims, 11 Drawing Sheets

(51) Int. Cl.
*F16J 15/08* (2006.01)
*F16L 23/20* (2006.01)
*F16J 15/06* (2006.01)

(56) References Cited

U.S. PATENT DOCUMENTS

| | | | |
|---|---|---|---|
| 3,482,860 A | 12/1969 | Dawbarn et al. |
| 3,834,744 A | 9/1974 | Masatchi |
| 4,040,636 A | 8/1977 | Albertson et al. |
| 4,403,795 A | 9/1983 | Davlin |
| 4,540,186 A | 9/1985 | Beidler |
| 4,616,860 A | 10/1986 | Faria et al. |
| 4,854,597 A | 8/1989 | Leigh |
| 5,058,935 A | 10/1991 | Eidsmore |
| 5,087,085 A | 2/1992 | McGarvey |
| 5,163,721 A | 11/1992 | Babuder |
| RE34,144 E | 12/1992 | Leigh |
| 5,222,747 A | 6/1993 | McGarvey |
| 5,308,124 A | 5/1994 | Yamaji et al. |
| 5,340,170 A | 8/1994 | Shinohara et al. |
| 5,366,261 A | 11/1994 | Ohmi et al. |
| 5,409,270 A | 4/1995 | Shinohara et al. |
| 5,433,454 A | 7/1995 | Ramberg |
| 5,472,216 A | 12/1995 | Albertson et al. |
| 5,505,464 A | 4/1996 | McGarvey |
| 5,681,064 A | 10/1997 | Aldridge et al. |
| 5,720,505 A | 2/1998 | Ohmi et al. |
| 5,803,507 A | 9/1998 | Vu |
| 5,887,876 A | 3/1999 | Aldridge et al. |
| 5,904,381 A | 5/1999 | Ohmi et al. |
| 5,967,489 A | 10/1999 | Nakazawa et al. |
| 5,979,910 A | 11/1999 | Shinohara et al. |
| 6,039,319 A | 3/2000 | Coonce et al. |
| 6,073,969 A | 6/2000 | Zimmerly |
| 6,145,888 A | 11/2000 | Ohmi et al. |
| 6,161,875 A | 12/2000 | Yamaji et al. |
| 6,357,760 B1 | 3/2002 | Doyle |
| 6,390,512 B1 | 5/2002 | Corbett |
| 6,688,608 B2 | 2/2004 | Doyle |
| 6,708,985 B1 | 3/2004 | Doyle |
| 6,769,697 B1 | 8/2004 | Ishikawa et al. |
| 6,845,984 B2 | 1/2005 | Doyle |
| 7,140,647 B2 | 11/2006 | Ohmi et al. |
| 7,303,194 B2 | 12/2007 | Smith, III |
| 7,370,674 B2 | 5/2008 | Doyle |
| 7,370,865 B2 | 5/2008 | Vik et al. |
| 7,448,276 B2 | 11/2008 | Crockett et al. |
| 7,458,397 B2 | 12/2008 | Doyle |
| 7,497,482 B2 | 3/2009 | Sugiyama et al. |
| D598,988 S | 8/2009 | Jaccoby et al. |
| 7,675,611 B2 | 3/2010 | Azimi et al. |
| 7,905,497 B2 | 3/2011 | Doyle |
| 7,928,391 B2 | 4/2011 | Azimi et al. |
| 8,246,087 B1 | 8/2012 | Yamaji et al. |
| 2002/0195165 A1 | 12/2002 | Vu |
| 2004/0129324 A1 | 7/2004 | Vu |
| 2006/0011247 A1 | 1/2006 | Vu |
| 2006/0055122 A1 | 3/2006 | Itoi et al. |
| 2007/0034016 A1 | 2/2007 | Maginnis et al. |
| 2007/0113663 A1 | 5/2007 | Crockett et al. |
| 2008/0054574 A1 | 3/2008 | McGarvey |
| 2008/0191426 A1 | 8/2008 | Doyle |
| 2009/0021024 A1* | 1/2009 | Prabhu et al. ............ 292/256.6 |
| 2010/0283209 A1 | 11/2010 | Vanderzyden |
| 2010/0313976 A1 | 12/2010 | Vu |
| 2011/0133415 A1 | 6/2011 | Vu |
| 2012/0028548 A1* | 2/2012 | Prabhu et al. .................. 451/60 |
| 2012/0139190 A1 | 6/2012 | Doyle |
| 2013/0154253 A1 | 6/2013 | Yuhara et al. |

OTHER PUBLICATIONS

Cussac, Y.; "International Preliminary Report on Patentability and the Written Opinion of the International Searching Authority"; Apln. No. PCT/US2011/063429; dated Jun. 20, 2013; 8 pages.

Laureta, D., et al.; http://www.electroiq.com/articles/sst/print/volume-40/issue-4/features/gases/new-torque; webpage printed Aug. 27, 2013; "New Torque Suppressor Cures Problems of Metal Face Seal Fittings, Solid State Technology, PennWell Publishing Company", 1997; 5 pages.

Bang, K.G., International Search Report, Apln. No. PCT/US2011/063447, dated Aug. 27, 2012; 3 pages.

Bang, K.G., Notification of Transmittal of the International Search Report and the Written Opinion of the International Searching Authority, or the Declaration, Apln. No. PCT/US2011/063429,mailed Jul. 30, 2012; 11 pages.

*General Components, Inc.* v. *Micron Technology, Inc., et al.*; United States District Court, Eastern District of Virginia; Civil Action No. 2:11cv152; Opinion and Order filed Jun. 1, 2012; 28 pages.

Non-Final Office Action from U.S. Appl. No. 13/312,156 mailed May 12, 2014; 23 pages.

* cited by examiner

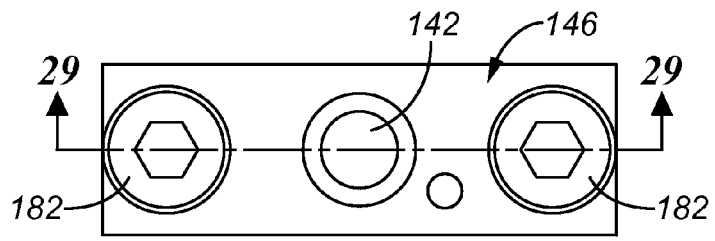
FIG. 28
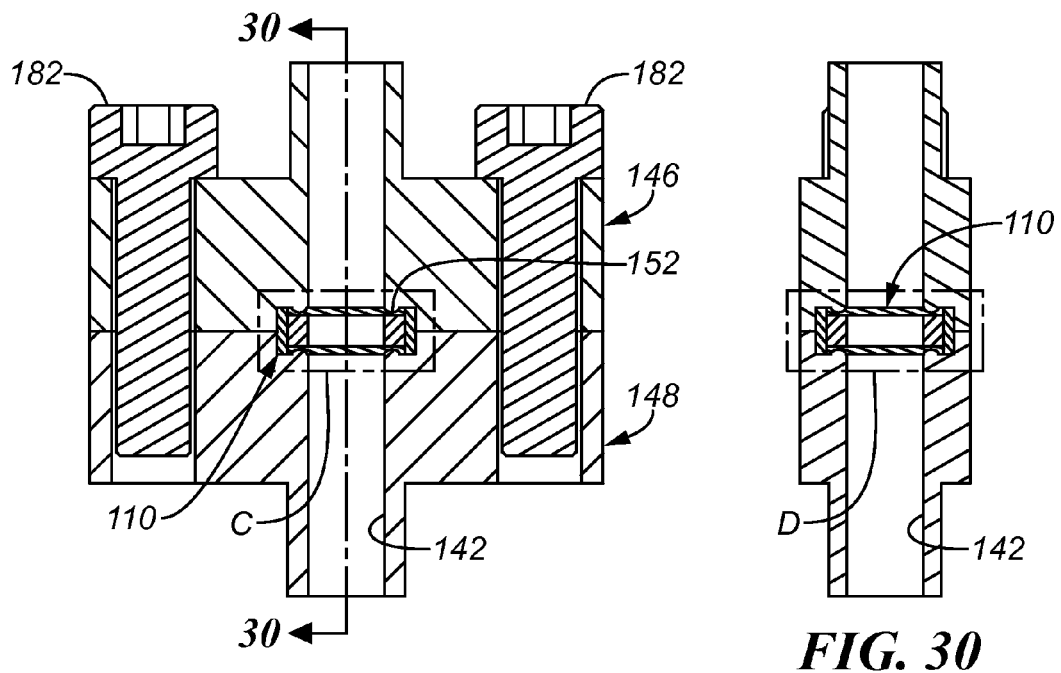
FIG. 29  FIG. 30

RING SEAL RETAINER ASSEMBLY AND METHODS

CROSS REFERENCE TO RELATED APPLICATION(S)

This application is a Continuation-In-Part application of International Application No. PCT/US2011/063429, filed Dec. 6, 2011, designating the United States which claims the benefit of U.S. Provisional Application No. 61/420,268, filed Dec. 6, 2010; this application is also a Continuation-in-Part of U.S. application Ser. No. 13/312,156, filed Dec. 6, 2011, which claims the benefit of U.S. Provisional Application No. 61/420,268, all of which are hereby incorporated herein by reference in their entireties.

TECHNICAL FIELD

This invention relates generally to fluid couplings and more particularly to fluid couplings having seal assemblies including flexible gaskets and flexible retainers for those gaskets.

BACKGROUND

Ring seals are typically annularly shaped, defining an axially aligned hole for gas or fluid passage, two axially opposed end surfaces, a radial inner surface and a radial outer surface. A simplistic ring seal has planar end surfaces and smooth circular radial inner and outer surfaces that define the inner diameter (ID) and outer diameter (OD) of the ring seal. However, it is common practice in the industry to utilize seals having different radial cross-sections to obtain varying sealing capabilities for different fluid flow environments.

A commonly used ring seal is circular and has a radial cross-section of a "C" shape. These "C seals" are constructed with the open side of the C construction facing the center of the ring such as is described in U.S. Pat. No. 5,354,072, ("the '072 patent") or with the open side of the C facing away from the center of two mating surfaces are brought together with the C seal in the middle, where the C seal is compressed with the open side of the C cross-section closing during compression. The ductile properties of the seal permit plastic deformation to occur without damaging the mating surfaces.

Additional seals that have been available include "V" seals, which are also circular, but instead of having a "C" cross-section, have a "V" cross-section with the low point of the V constructed to point either inwardly or outwardly towards the center of the seal. Other seals known in the art include "Z" seals and simple O-rings. These other types of seals are discussed, for example, in U.S. Pat. No. 6,708,985 ("the '985 patent"). Both of the '072 and '985 patents are herein expressly incorporated by reference, in their entirety. Still another type of ring seal known in the industry is the "W" seal. Such a sealing system is disclosed, for example, in U.S. Pat. No. 7,140,647 ("the '647 patent"), also herein expressly incorporated by reference, in its entirety. The "W" seal in the '647 patent uses a snap ring situated on the inside of a retaining ring, identified in the patent as a guide, to retain the W-seal in the retainer and to keep the sealing surfaces on the W-seal or gasket protected from scratches. The '647 patent retainer or guide also has a snap ring situated on its outside diameter to keep the retainer engaged in the 'counterbore.'

FIGS. 1-4 illustrate a typical prior art W-seal 2, comprising a retainer sleeve 2a, and a metal seal 2b. As discussed above, the assembly 2 further comprises an interior snap ring 2c and an exterior snap ring 2d. To accommodate these snap rings, there is provided a first Outside Diameter (OD) groove 2e on the outer surface of the retainer sleeve 2a, and an Inside Diameter (ID) groove 2f on the inner surface of the retainer sleeve 2a. Additionally, a second OD groove 2g is provided on the outer surface of the metal seal 2b, which corresponds to the ID groove 2f, wherein the second OD groove 2g and the ID groove 2f together accommodate the interior snap ring 2c. It should be noted that the cut in the ring and seal shown in FIG. 2 is illustrative only, for the purpose of illustrating particular constructional features of the seal assembly. In actuality, both the seal and the retaining ring are circumferentially continuous and unbroken.

Thus, each prior art W-seal requires four separate parts, including two snap rings and three formed grooves for accommodating those snap rings, resulting in manufacturing complexity and relatively high cost. Additionally, these snap rings have been found to make it substantially more difficult to remove the seal from the counterbore when desired, causing productivity problems and sometimes damage to the seal assembly. For instance, when the seals are used to connect two channels designed to carry very high purity gases such as in a silicon deposition environment, impurities introduced into the system by the seal can impact the performance of an entire system. For example, out-gassing of impurities from the surfaces exposed to the interior of the vacuum environment in the system can unacceptably pollute the system. Because known W-seals are made to have a tight slip fit between the seal 2b and the retainer sleeve 2a and between the retainer sleeve 2a and the counterbore, minor damage to the counterbore material and the retainer sleeve during installation and removal during maintenance can increase the amount of material exposed to the vacuum environment, thereby increasing the potential for introduction of excess impurities from out-gassing from that material.

In one operation environment, gas and vapor handling equipment deliver reactant and inert gasses and vapors to a tool such as an epitaxial reactor, a plasma etcher, and the like, which are used in the manufacture of semiconductors. Such equipment includes gas sticks, which employ a semi-modular design and may be rapidly constructed and easily and quickly maintained. Maintenance would include replacement of active gas delivery and metering components along a gas flow path. Such active components may include valves, pressure regulators, mass flow meters and mass flow controllers. The active components are secured in a gas flow path through a substrate or substrate blocks by the use of block or face type connectors.

The block connectors minimize contamination of the gas flow path by reducing the wetted surface. The wetted surface is the interior surface of a gas flow path that contacts the gas. The smaller the wetted surface that is presented the smaller the amount or likelihood that the surface will be contaminated with unwanted gas species during assembly during an initial build or during maintenance when the flow path is torn down.

Some prior seals and retainers for face block systems may introduce unwanted contaminants via abrasion and physisorption and chemisorption on the seal surfaces. The existing face seal systems use a small area, sealing zone to reduce contamination by reducing the wetted area at the connector joint. This is done by making sure the sealing zone is essentially flat with no portions of one connector extending into the other connector as is common in less stringent applications. The threaded members holding the connector halves are positioned a substantial distance away from the flow path to avoid contaminating it with particulates generated during tightening or loosening of the connector bolts. Likewise there is no threading along the outside of the flow path at the connector break of the type found in a garden hose. Such a "threaded pipe" construction might generate particulates in the immediate vicinity of the flow path during tightening. Despite this some problems remain. The W-seal is an example.

The above described seal uses a retainer that cannot be characterized as "low force." The snap ring on the outer surface or its retainer comes in sliding contact with the wall of the counterbore during assembly. Because a relatively large force is needed to set the seal and retainer, alignment problems can arise and the snap rings abrade the counterbore walls generating contaminating particulates.

What is needed, for certain sealing system applications, is a seal system that affords certain functional advantages without the necessity and expense involved in employing snap rings, and which is preferably constructed to permit easy removal from the counterbore.

SUMMARY

Pursuant to these various approaches, a ring sealing system suitable for applications such as a semiconductor manufacturing modular gas delivery system is described.

More specifically, an example sealing system includes a retainer for a seal (also called a gasket) used to connect modular piping in a modular gas delivery system to the gas flow controlling components. The retainer design protects the polished sealing surface of the seal from scratches before assembly by suspending the seal inside the retainer, with some clearance around the seal regardless of orientation. Additionally, a slit or gap in the circumference of the retainer allows the retainer to flex open for insertion of the seal gasket. A small chamfer on the ID of the retainer, in certain aspects, aids the easier insertion of the seal into the retainer. A similar chamfer on an edge of the seal further aids this insertion process.

The gap in the circumference of the retainer also allows the retainer to compress to a smaller circumference, for a tight fit inside the sealing counterbore. A groove in the ID of the retainer includes a protruding portion for the seal to engage. The depth of this groove is configured such that with a complete compression of the retainer where the circumferential gap is completely closed, the protruding edge of the seal still has some clearance inside the retainer. This clearance, which acts as a stop to prevent the retainer from being overly compressed, ensures that the seal and retainer assembly will not jam during insertion of the assembly into the counterbore.

The slit or gap in the circumference of the retainer allows for a larger tolerance in the machining on the OD of the retainer. With current designs, a slightly oversized OD will prevent insertion of the retainer and seal assembly into the counterbore because there is no room for compression. In one example of the retainer described herein, the retainer is free to close up to 0.010 inches. The gap in the circumference can be made larger and achieve the same results.

There is a slight chamfer around the OD of the retainer for easier location of the retainer on the counterbore. The top half of the retainer has a slightly smaller OD for easy alignment of surface mount components. For instance, an installer can grasp this smaller OD and use the larger OD to engage a particular sealing point of multiple sealing points on the same block.

In one example application, there is provided a ring seal assembly, which comprises an annular seal member having an inner diameter (ID) and an outer diameter (OD), and having an axial hole defined by the ID for fluid passage, wherein the OD of the seal member comprises a smaller OD portion and a larger OD portion. An annular retaining member is also provided, having an ID and an OD, wherein the ID of the retaining member is larger than the OD of the seal member. Advantageously, the ID of the retaining member comprises an axially cylindrical first portion and a second portion comprising a groove extending radially outwardly of the first portion for receiving and accommodating the larger OD portion of the seal, which extends radially outwardly into the groove.

An additional feature in certain examples is the employment of a chamfer on at least one outside corner of the annular retaining member for easing installation of the retaining member into a counterbore. A chamfer may also be disposed on at least one inside corner of the annular retaining member for easing insertion of the sealing member into the retaining member. Yet another feature in certain examples is the inclusion of a load adjustment groove disposed on the seal member for improving the elastic response of the seal.

In yet another aspect, there is provided a ring seal assembly, which comprises an annular seal member having an inner diameter (ID) and an outer diameter (OD), and having an axial hole defined by the ID for fluid passage. An annular retaining member has an ID and an OD, wherein the ID of the retaining member is larger than the OD of the seal member. A chamfer is disposed on at least one inside corner of the annular retaining member for easing insertion of the sealing member into the retaining member. Another chamfer is disposed on at least one outside corner of the annular retaining member for easing insertion of the retaining member into a counterbore.

In still another aspect, a method for assembling a ring seal assembly includes radially expanding a retainer during insertion of a seal into the retainer to be supported by a groove in an inside surface of the retainer. The retainer expands at a slot or slots in the retainer's circumference. The retainer in certain examples includes a chamfer on an inside corner of the retainer, and the seal may include a chamfer on a seal outer corner to facilitate seal insertion. There is space around the seal to allow the retainer to compress around the seal during insertion of the retainer into a counterbore. For instance, a chamfer on an outside corner of the retainer guides the insertion by engaging the counterbore surface, which engagement slightly compresses the retainer at the slots with the slots restricting the compression such that the compression does not result in mechanical compression of the seal. After insertion into the counterbore, the retainer expands into the counterbore while supporting the seal for compression between elements defining the flow path.

So configured, a retainer according to these teachings when used in a semiconductor manufacturing environment may act as shield to reduce abrasion and contamination of the seal during assembly with the retainer and while stored and being handled prior to and during assembly with a counterbore of a block, a handle to avoid contamination of the seal during assembly of the retainer and seal combination with a block, and a low force locator to avoid generating contaminants at the flow path adjacent the counterbore and spreading those contaminants throughout the downstream portion of the remainder of the flow, into a tool, and onto a semiconductor being processed. The low force retainer spreads the contact force at the counterbore wall along a larger surface reducing pressure and the likelihood of abrasion.

In certain aspects, the retainer provides an outer handling jacket to avoid contacting the seal with any solids that could cling to the surface or even abrade it. Even small scratches on a mating surface of a seal increase the wetted area and provide additional sites for sorption of contaminating gasses and water vapor prior to assembly in a gas stick.

The face type connectors when properly assembled should not have a seal touching anything other the mating beads of the flow path defining elements. This avoids contaminating the flow path by scraping a seal along a tight counterbore during assembly. The seal in this approach should be in registration with the beads during connector closure. In some aspects, an example retainer of these teachings solves these problems by allowing the seal to "float" slightly. The seal only has very low forces applied to it by the retainer. The low forces avoid abrasion of the seal by the interior of the retainer and abrasion of the retainer by the seal. This avoids introducing particulates into the flow path.

These and other benefits may become clearer upon making a thorough review and study of the drawings and the following detailed description. In these accompanying drawings, like reference numerals designate like parts throughout the figures.

BRIEF DESCRIPTION OF THE DRAWINGS

FIG. 28 is a top view of an example fluid flow system constructed in accordance with various principles of the invention;

FIG. 29 is a cross-sectional view taken through lines 29-29 of FIG. 28;

FIG. 30 is a cross-sectional view taken through lines 30-30 FIG. 29;

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Figure 22:
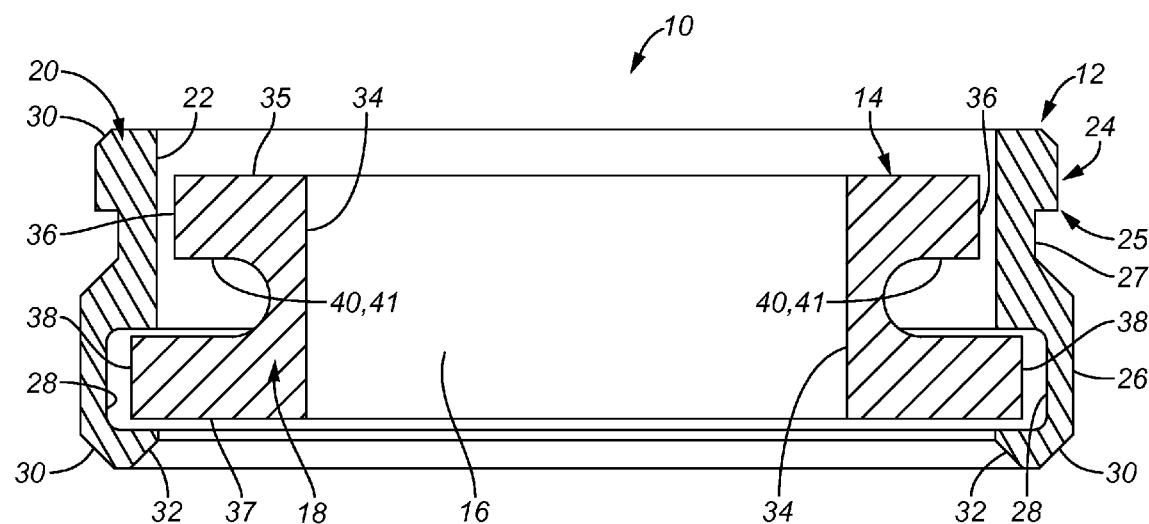
FIG. 22 is a cross-sectional view illustrating an example retaining ring and gasket in an assembled state constructed in accordance with various principles of the invention.
Figure 23:
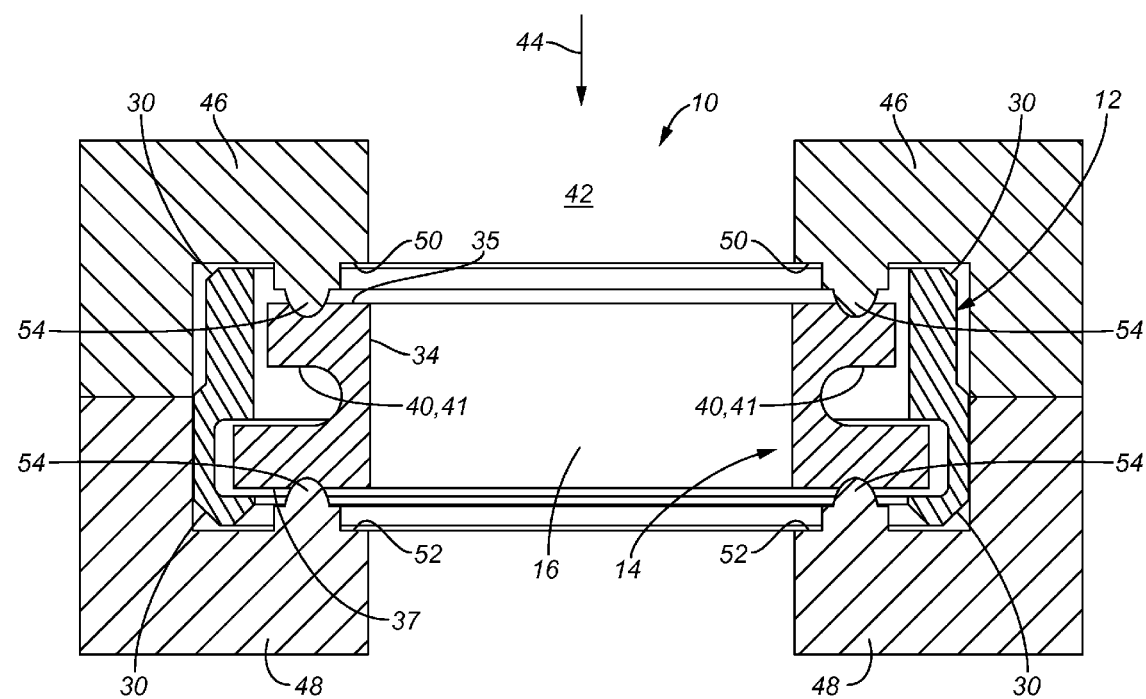
FIG. 23 is a cross-sectional view similar to FIG. 22 illustrating the assembled seal after it has been fully installed and compressed to its operational status.

Referring now more particularly to FIGS. 5-30, wherein the terms "lower" and "upper" are with respect to the figures only and not necessarily with the orientation of the sealing assembly in an actual installation, there is shown in FIGS. 22 and 23 an example ring seal assembly 10 including a retainer or retaining ring 12 surrounding, in circumferential fashion, an annular gasket or seal 14. As illustrated in FIG. 22, the seal 14 comprises a center hole 16 and an annular body element 18. The retainer 12 is also annular in construction and comprises an annular body element 20 defining a center hole 22 into which the seal 14 is inserted. The retainer material should have sufficient elastic properties to allow expansion and compression as described herein and recover its original shape and be machined or otherwise formed into the described shapes; such materials may include metal, polymer, or any other suitable material. The seal material should have an elastic property to allow compression and spring back for good sealing along an axial flow path when compressed between elements that define the flow path. In a seal used in a wafer fabrication environment where high purity of the gases passing through the flow path is required, materials such as 316 double melt stainless steel, nickel, HASTELLOY (available from Central States Industrial Equipment & Service, Inc.), and AL-6XN (available from Central States Industrial Equipment & Service, Inc.) are exemplary suitable materials.

In the illustrated example of FIGS. 22 and 23, the outer diameter (OD) of the retaining ring 12 is stepped, having a smaller OD portion 24 and a larger OD portion 26. A retainer ID groove 28 is disposed on the ring 12, within the larger OD portion 26. An outer chamfer 30 is disposed on each corner on the OD of the retainer 12. Inner chamfers 32 are disposed on the lower corners of the ID of the retainer 12.

The seal 14 comprises a substantially cylindrical ID 34 surrounding and defining the center hole 16. The OD of the seal 14 comprises a smaller OD portion 36 and a larger OD portion 38. In certain approaches, between these two portions 36, 38 is disposed a load adjustment groove 41 (see, for example, FIGS. 18-21), or, in another approach, bores 40 (see, for example, FIGS. 13-16 and 25). The load adjustment groove 41 or bores 40 provide a elasticity to the seal 14 that facilitates a sealing engagement with the fluid path defining elements. For example, the load adjustment groove 41 or bores 40 increase the elasticity of the seal 14. This improved elasticity better distributes the forces applied by the beads of the flow path defining elements during the sealing process. The beads may not be axially aligned, and in such a situation, the seal having insufficient elasticity may deform in a manner applying excess transverse forces to the beads, which can result in a poor sealing effect and/or damage the beads such that they cannot from a new seal after being reset. The seal elasticity provided by the load adjustment groove 41 or bores 40 at least partially better manages these forces to alleviate these potential adverse results during the sealing process. The bores 40 may have a variety of depths or shapes other than those illustrated and can be tailored to a given application.

FIG. 23 illustrates the ring seal assembly 10 in an installed configuration. As illustrated, the seal assembly 10 is disposed within a gas or fluid flow path 42, wherein the fluid flow moves in the direction of the arrow 44. Defining the fluid flow path 42 are a component 46 and a base block 48. A component counterbore 50 is machined into the component 46, while a complementary base block counterbore 52 is machined into the base block 48. It is noted that the outer chamfers 30 are advantageously designed to permit easy insertion of the retaining ring 12 into the counterbores 50, 52. The inner chamfers 32 facilitate ready insertion of the seal 14 into the center hole 22 of the retainer 12.

Upon installation of the seal assembly 10 into the flow path 42, the component 46 and base block 48 are compressed axially about the seal assembly 10, causing a sealing bead 54 to engage the seal 14, as illustrated in FIG. 23. It is noted that, even when fully compressed, the retainer 12 remains spaced from the walls defining the counterbore 50, 52, as shown in FIG. 23, allowing continued play between the retainer 12 and the counterbore 50, 52.

The retainer 12 extends axially substantially above and below the seal 14. So configured, even when compressed, the upper and lower surfaces of the seal 14, which are highly polished, are protected from damage such as scratching to preserve optimal seal integrity.

With reference now to FIGS. 5-21 and 25, various embodiments of each of the retainer 12 and seal 14 are illustrated. It should be noted that any of the retainer examples and seal examples may be employed, as shown in FIGS. 22 and 23, within the scope of these teachings, with a caveat that specific complementary features and dimensions of each element should be coordinated to fit together appropriately. The specific dimensions shown in the figures are exemplary only.

With respect to FIGS. 5-8, one example retaining ring 12 is shown. As illustrated, a slot or gap 56 is configured to facilitate fixation of the retainer 12 and seal 14 within the counterbore. The radial slot 56 passes completely through the wall of the retainer 12 for its entire axial length, thereby making it feasible to temporarily spread the slot (gap) 56 elastically. This spreading of the gap 56 enlarges the effective diameter of the center hole 22 sufficiently to accept the larger outside diameter portion 38 of the seal 14, and to easily position the retainer inside diameter groove 28 over the larger outside diameter portion 38 of the seal 14. This arrangement thus allows the seal 14 to effectively float within the confines of the retainer 12 and reduces scraping of the seal 14 and the retainer 12 during positioning of the seal 14 in the retainer 12. The angles of the various chamfers may be defined according to a given application with an example angle being about forty-five degrees.

FIGS. 9-12 illustrate a somewhat modified example retaining ring 12. The primary difference between this example and that of FIGS. 5-8 is the utilization of a retaining ring having a stepped OD. The retainer 12 includes a retainer outer surface having a first outer diameter 24 and a second outer diameter 26 with the first outer diameter 24 being smaller than the second outer diameter 26. The retainer 12 further includes a retainer inner diameter of the center hole 22, the inner diameter being stepped to define a groove 28 in an inner surface of the retainer 12 inside and opposite of the retainer outer surface's second outer diameter 26. The groove's diameter is larger than the retainer's center hole 22 ID and smaller than the second outer diameter 26.

FIG. 22 illustrates another example retainer 12, in this case having a hook-like edge feature to facilitate identification of the orientation of the retainer and removal of the retainer from a counterbore. In this example, the first outer diameter 24 of the retainer 12 defines a step 25 radially inward from the first outer diameter 24 to a third outer diameter 27 that is smaller than the first outer diameter 24. The step 25 is configured to facilitate engagement with a member to extract the second outer diameter 26 from a counterbore.

Figure 27:
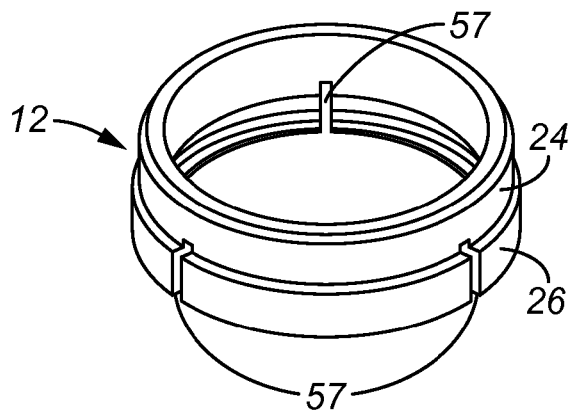
FIG. 27 is a perspective view of an example retainer constructed in accordance with various principles of the invention.

FIG. 27 illustrates yet another example retainer 12, in this case having three partial slots 57 defined in the second outer diameter 26. These slots 57 operate like the slot 56 that fully splits the retainer 12 in that the slots 57 allow for elastic expansion of the retainer 12 during insertion of the seal and for elastic compression of the retainer 12 during insertion of the assembly into a counterbore. Although three slots 57 are illustrated, the number of slots 57 can be tailored to a given application.

Figure 1:
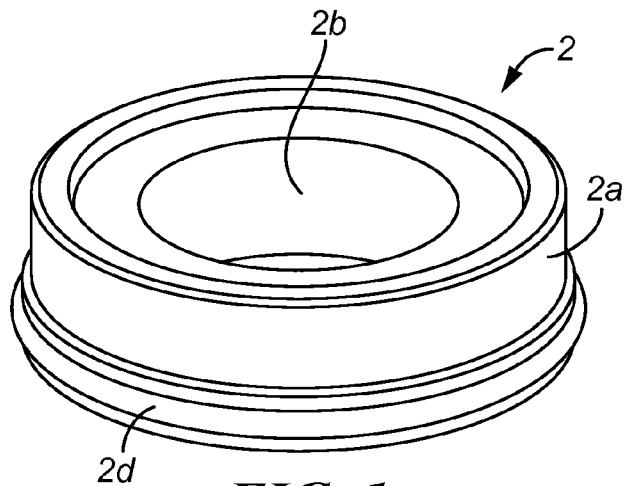
FIG. 1 is an isometric view of a prior art W-seal.
Figure 2:
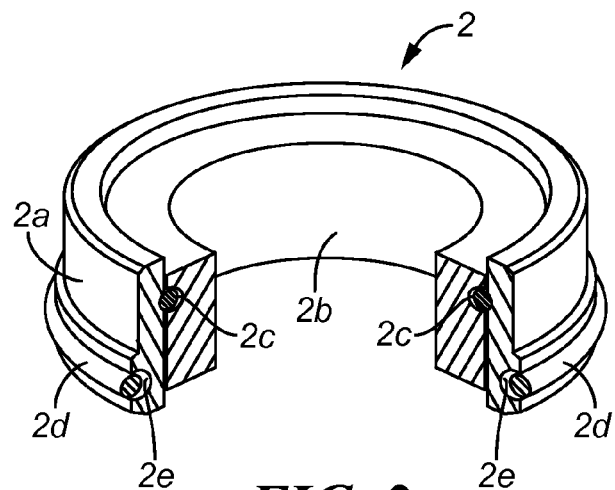
FIG. 2 is an isometric view of the W-seal shown in FIG. 1, wherein a circumferential portion has been removed to illustrate a cross-section of the seal.
Figure 3:
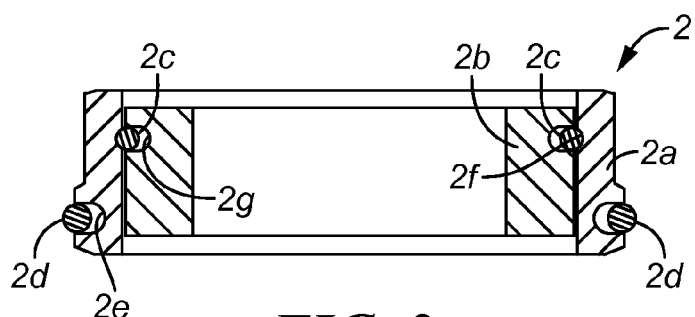
FIG. 3 is a cross-sectional view of the prior art W-seal shown in FIGS. 1 and 2.
Figure 4:
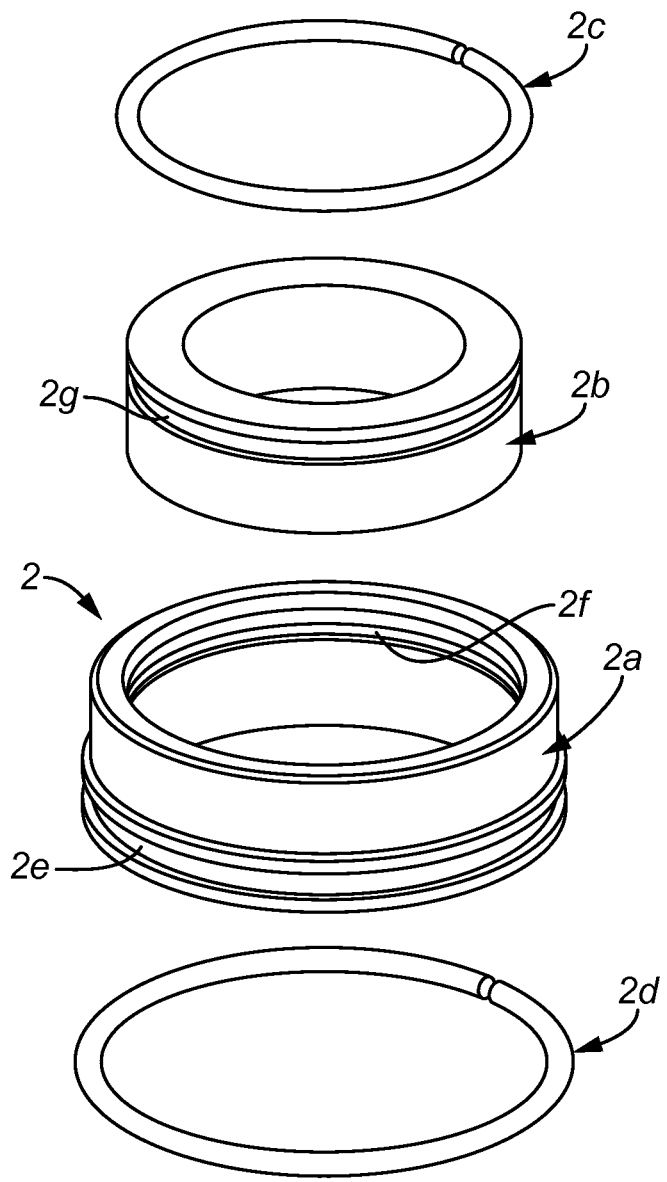
FIG. 4 is an exploded view of the prior art W-seal shown in FIGS. 1-3.
Figure 5:
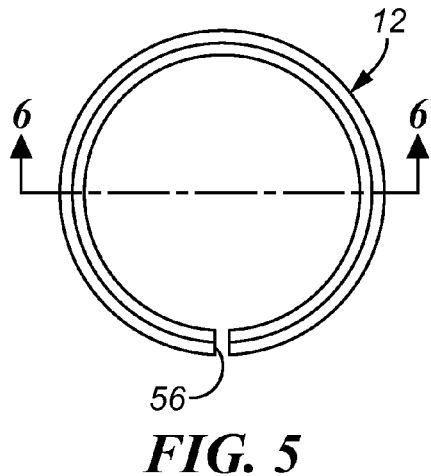
FIG. 5 is a top view of one example a retaining ring constructed in accordance with various principles of the invention.
Figure 6:
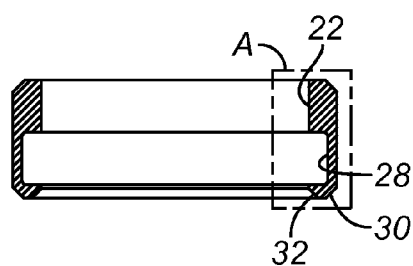
FIG. 6 is a cross-sectional view of the retaining ring shown in FIG. 5.
Figure 8:
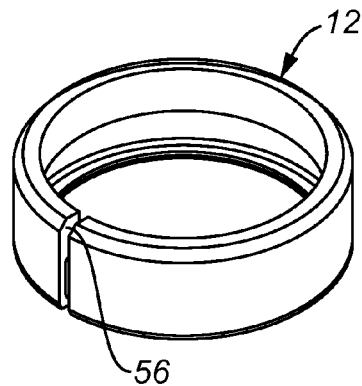
FIG. 8 is an isometric view of the retaining ring of FIGS. 5-7.
Figure 7:
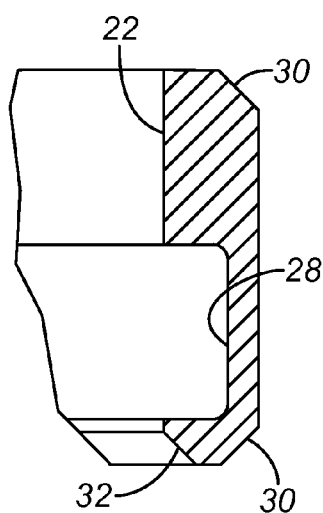
FIG. 7 is a detailed cross-sectional view of the portion of FIG. 6 denoted by the letter A.
Figure 9:
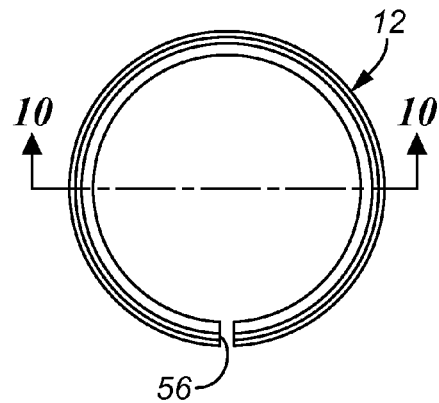
FIG. 9 is a top view of a modified example retaining ring constructed in accordance with various principles of the invention.
Figure 10:
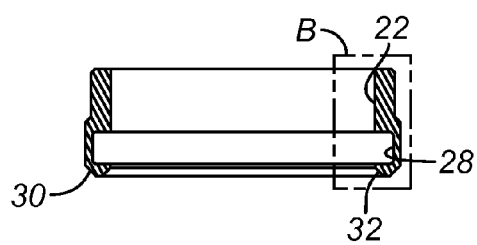
FIG. 10 is a cross-sectional view of the retaining ring shown in FIG. 9.
Figure 12:
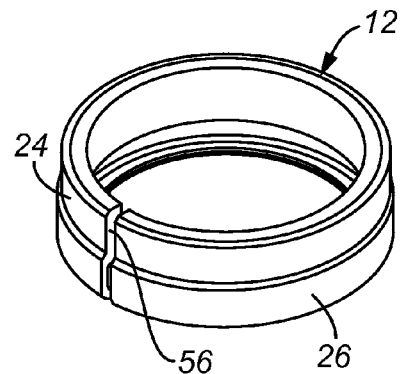
FIG. 12 is an isometric view of the retaining ring of FIGS. 9-11.
Figure 11:
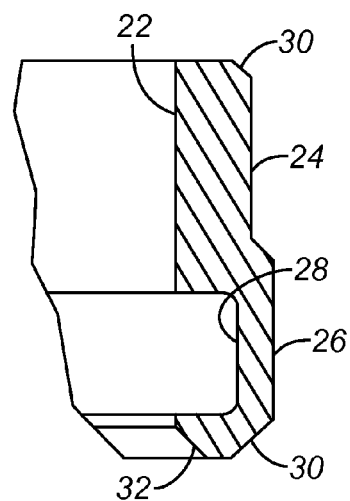
FIG. 11 is a detailed cross-sectional view of the portion of FIG. 10 denoted by the letter B.
Figure 13:
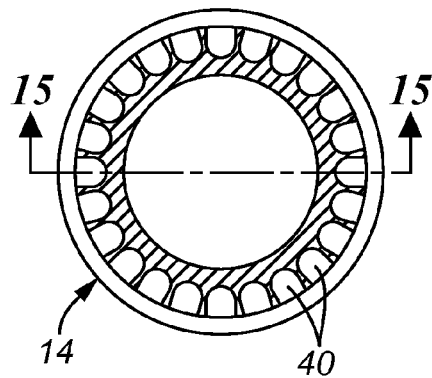
FIG. 13 is a top view of an example seal gasket constructed in accordance with various principles of the invention.
Figure 16:
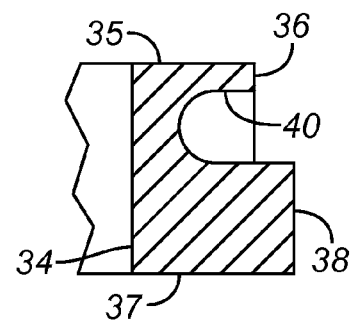
FIG. 16 is a detailed cross-sectional view of the portion of FIG. 15 denoted by the letter C.
Figure 14:
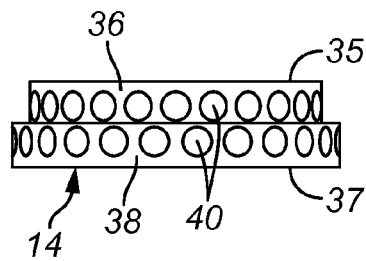
FIG. 14 is an elevation of the gasket shown in FIG. 13.
Figure 17:
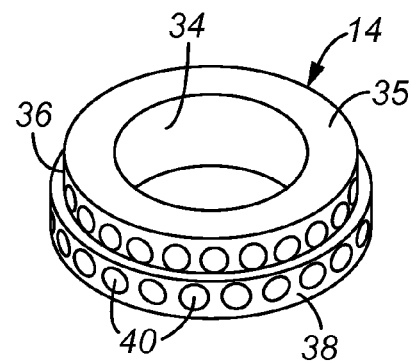
FIG. 17 is an isometric view of the gasket shown in FIGS. 13-16.
Figure 15:
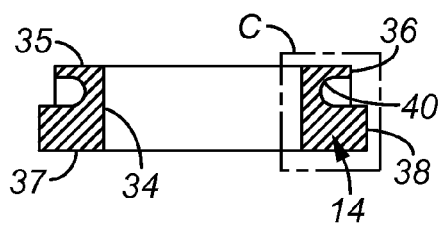
FIG. 15 is a cross-sectional view of the gasket shown in FIGS. 13 and 14.
Figure 18:
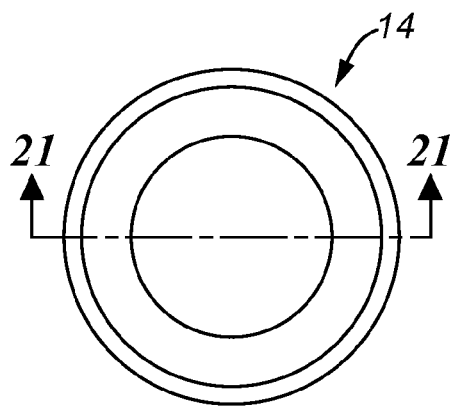
FIG. 18 is a top view of a modified example seal gasket constructed in accordance with various principles of the invention.
Figure 19:
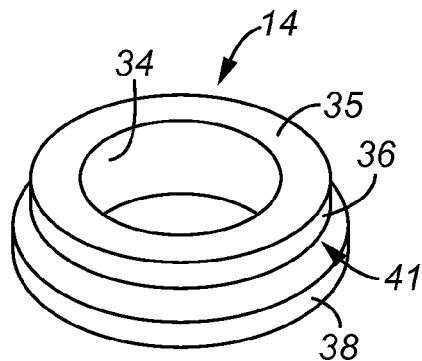
FIG. 19 is an isometric view of the gasket shown in FIG. 18.
Figure 20:
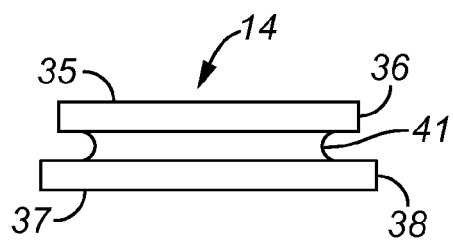
FIG. 20 is an elevation of the gasket shown in FIGS. 18 and 19.
Figure 21:
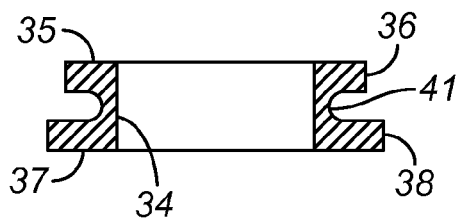
FIG. 21 is a cross-sectional view of the gasket illustrated in FIGS. 18-20.

FIGS. 13-17 illustrate an example seal having a smaller OD portion 36 and a larger OD portion 38 and having a plurality of bores 40 spaced and disposed in each of the smaller OD portion 36 and the larger OD portion 38. The ring shaped seal 14 includes top 35 and bottom 37 surfaces configured to be compressed when in a sealing configuration. A stepped outer diameter is defined between the top 35 and bottom 37 surfaces with a first outer diameter 36 being smaller than the second diameter 38. A plurality of bores 40 are defined in at least two rows in one or both of the first outer diameter 36 and the second outer diameter 38. The plurality of bores 40 are sufficient to effect resiliency in the seal 14 in response to compression of the seal 14 on the top 35 and bottom 37 surfaces. The bores 40 in the example of FIGS. 12 and 13 circumferentially alternate so that only one is shown in FIG. 12.

FIGS. 18-21 illustrate a somewhat modified example of the gasket or step seal 14. The primary difference, other than with respect to certain dimensions, between the two examples is that in the FIG. 18 example a single circumferential load displacement groove 41 is employed, instead of the bores 40 of FIGS. 13-17. The groove 41 is defined between the first outer diameter 36 and the second outer diameter 38 sufficient to effect resiliency in the seal 14 in response to compression of the seal 14 on the top 35 and bottom 37 surfaces.

Figure 25:
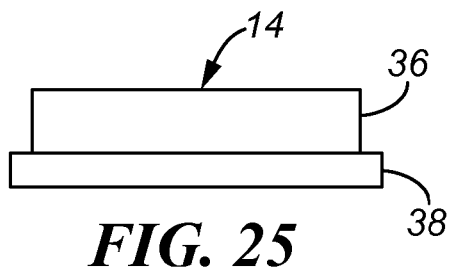
FIG. 25 is a side view of another example seal constructed in accordance with various principles of the invention.
Figure 26:
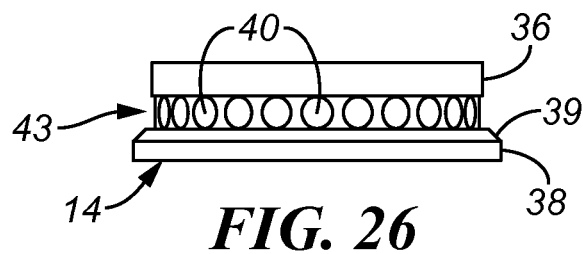
FIG. 26 is a side view of another example seal constructed in accordance with various principles of the invention.

FIG. 25 illustrates an example seal 14 having a step between a smaller OD portion 36 and a larger OD portion 38, but having no groove or bores. FIG. 26 illustrates another example seal having a stepped OD, comprised of smaller OD portion 36 and larger OD portion 38. In this example, a portion 43 of the smaller OD portion 36 adjacent the larger OD portion 38 includes bores 40 distributed around the perimeter of the portion 43. Although the example of FIG. 26 shows the portion 43 as having a smaller OD than that of the smaller OD portion 36, the portion 43 may have an OD co-extensive with that of the smaller OD portion 36. The seal 14 of FIG. 26 further includes a chamfer 39 disposed on a edge of the outer diameter portion of the seal 14. The chamfer 39 is configured to facilitate placement of the seal 14 in the retainer by reducing the load needed to slide the seal 14 into the retainer. The chamfer 39 may be place on any outside edge that may engage the retainer during insertion of the seal 14 into the retainer.

Referring once again to FIG. 23, it is noted that there is play between the seal and the retainer, even when assembled. The reason for this is to ensure that when the retainer compresses, it does not hit the seal, because otherwise it would not be able to be compressed to a dimension smaller than the counterbore, which would affect seal integrity. The split or slot 56 facilitates this feature because it serves as the stop to control the amount of compression of the retaining ring 12. Upon compression, the ring 12 compresses until the two surfaces defining the slot engage one another. Also illustrated in FIG. 23, the larger OD portion 38 of the stepped seal is captured top and bottom by the retainer 14 in its relaxed or pre-compression position. There is no interference between the retainer and the elastic response modifying portions (perforations or load adjustment groove 40) of the seal.

Figure 24:
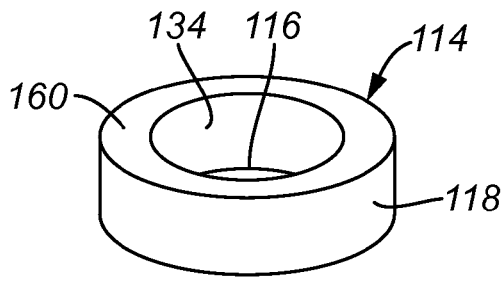
FIG. 24 is an isometric view of another example seal constructed in accordance with various principles of the invention.

In still another approach, FIG. 24 illustrates an annular seal 114 defining an aperture 116 with an inner diameter 134. The seal 114 defines no perforations or groove and has a single OD 118 between a top surface 160 and a bottom surface. In one example, this seal 114 (or a similar seal with a single OD 118 that defines a groove or bores) can be inserted into a retainer 12 as described herein to provide a sealing assembly with benefits similar to those discussed above with respect to FIGS. 22 and 23.

FIGS. 28-32 illustrate an example ring seal assembly 110 in a typical sealing environment, wherein a fluid flow path 142 to be sealed is defined by a component 146 and a base block 148, which are attached by bolts 182 or other suitable means. The seal 110 is adapted to be fitted within the space formed by the component counterbore and corresponding base block counterbore and to form a leak-tight fluid connection therein, via sealing beads 154.

Figure 31:
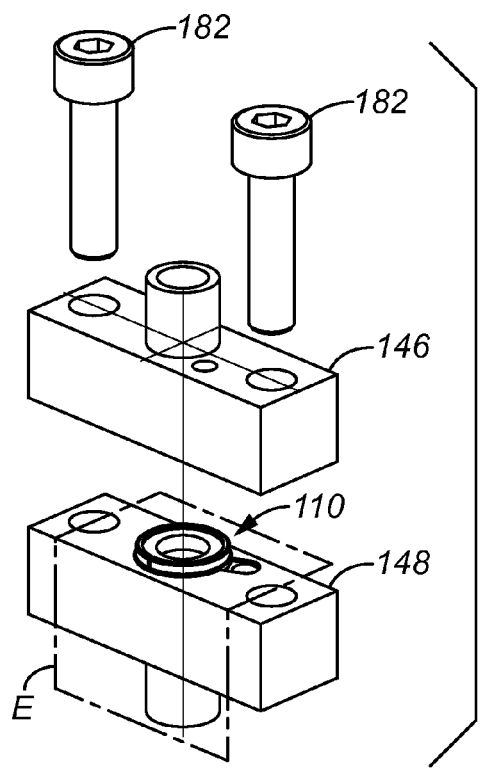
FIG. 31 is an exploded isometric view of the fluid sealing system shown in FIGS. 28-30.
Figure 32:
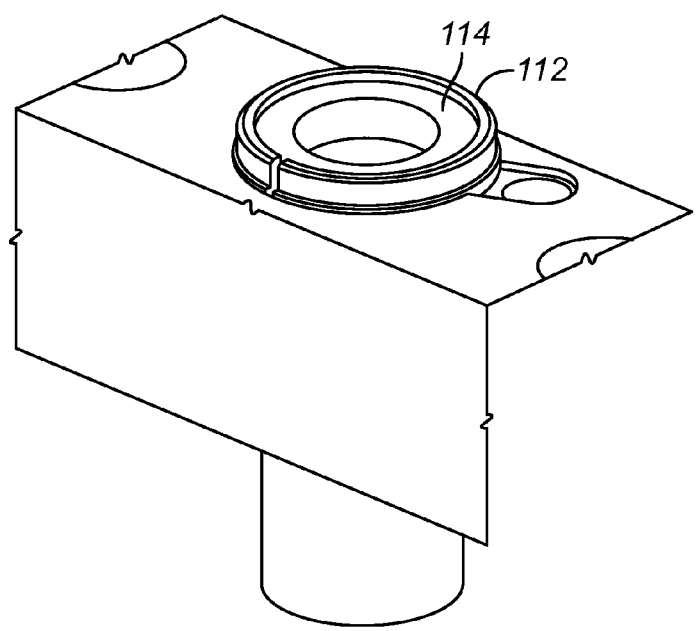
FIG. 32 is an enlarged exploded isometric view of the portion of the system illustrated in FIG. 31 denoted by the letter E.

FIGS. 31 and 32 illustrate the process of snapping the metal seal assembly into the seal port counterbore to install the seal. A method of assembling a ring-shaped retainer having at least one slot and a ring seal includes engaging the ring seal against a chamfer on an inside edge of the retainer to spread the retainer and sliding the seal into proximity with a retainer groove on an inside portion of the retainer. The retainer relaxes at least partially when the seal ring is in the groove such that the retainer in a relaxed state surrounds the right seal without clamping the ring seal. To position the seal assembly 110 in the counterbore, the retainer is squeezed with the seal retained in the groove, and the squeezed retainer is positioned relative to a counterbore. The retainer is released to effect placement of the retainer in the counterbore. The retainer inside diameter groove 28 supports the seal 14 and locates the seal at the center of the fluid path 142.

While this invention has been described with respect to various specific examples, it is to be understood that various modifications may be made without departing from the scope thereof. Therefore, the above description should not be construed as limiting the invention, but merely as an exemplification of preferred embodiments thereof and that the invention can be variously practiced within the scope of the following claims.

What is claimed is:

1. A ring seal assembly, comprising:
   an annular seal member having an inner diameter (ID) and an outer diameter (OD), and having an axial hole defined by the ID for fluid passage;
   an annular retaining member having an ID and an OD, the ID of the retaining member being larger than the OD of the seal member; and
   a chamfer including an angular flat surface on at least one inside corner of an axial most end of said annular retaining member, the chamfer configured to engage the seal member during insertion of the sealing member into the retaining member, the chamfer having an ID smaller than the OD of the annular seal member;
   wherein when the annular seal member is placed within the annual retaining member the annular seal member floats within the retaining member.

2. The ring seal assembly of claim 1 further comprising a chamfer on at least one outside corner of said annular retaining member for easing insertion of the ring seal assembly into a counterbore.

3. The ring seal assembly of claim 1, wherein the OD of the annular seal member comprises a smaller OD portion and a larger OD portion and the ID of the retaining member comprises an axially cylindrical first portion and a second portion comprising a groove extending radially outwardly of the first portion for receiving and accommodating the larger OD portion of the annular seal member, which extends radially outwardly into said groove, and wherein the smaller OD portion of the retaining member extends axially beyond the groove of the retaining member.

4. The ring seal assembly of claim 1 wherein the annular seal member comprises an annular metal seal having an ID, an OD, an upper sealing surface, and a lower sealing surface; and
   wherein the annular retaining member defines a slit comprising a break in a circumferential continuity of the annular retaining member, the slit configured to allow the annular retaining member to open during insertion of the annular seal member past the chamfer into the annular retaining member.

5. The ring seal assembly of claim 4, wherein in its assembled state, with the annular seal member disposed within the ID of the annular retaining member, there is a gap between the annular retaining member and the annular seal member about the circumference of the assembly, to thereby permit compression of the annular retaining member without substantial contact of the annular retaining member with the annular seal member.

6. The ring seal assembly of claim 4 further comprising a recess between an annular edge of the annular retaining member and one of the upper and lower sealing surfaces of the annular seal member when the ring seal assembly is in an assembled state, the recess functioning to protect the one of the upper and lower sealing surfaces from inadvertent contact damage.

7. The ring seal assembly of claim 6 further comprising a second recess between an opposing annular edge of the annular retaining member and the other of the upper and lower sealing surfaces of the annular seal member when the ring seal assembly is in the assembled state, to thereby protect the other of the upper and lower sealing surfaces from inadvertent contact damage.

8. The ring seal assembly of claim 4, wherein the assembly does not have any snap rings.

9. An apparatus for sealing an axial flow path defining axial directions, the apparatus comprising:
a ring shaped retainer having a retainer outer diameter (OD) and a retainer inner diameter (ID), the inner diameter being stepped to define a groove in an inner surface of the retainer, the groove diameter being larger than the retainer ID and smaller than the retainer OD;
a ring shaped seal comprising:
top and bottom surfaces configured to be compressed when in a sealing configuration,
a stepped outer diameter between the top and bottom surfaces with a first outer diameter being smaller than a second diameter, wherein the second diameter is larger than the retainer ID and smaller than the groove diameter,
a groove between the first outer diameter and the second outer diameter sufficient to effect resiliency in the seal in response to compression of the seal on the top and bottom surfaces;
wherein the groove in the inner surface of the ring shaped retainer defines top and bottom axially opposing surfaces extending between the retainer ID and the groove diameter, the top and bottom axially opposing surfaces disposed such that a portion of the ring shaped seal having the second diameter is disposed between the top and bottom axially opposing surfaces when the ring shaped seal is placed within the ring shaped retainer, wherein the top and bottom axially opposing surfaces limit axial movement of the ring shaped seal in both axial directions;
wherein when the ring shaped seal is placed within the ring shaped retainer the ring shaped seal floats within the ring shaped retainer.

10. The apparatus of claim 9 wherein the retainer comprises a retainer outer surface having a first outer diameter and a second outer diameter with the first outer diameter being smaller than the second outer diameter.

11. The apparatus of claim 9 wherein the retainer comprises a chamfer on an inner edge of the retainer configured to facilitate placement of the seal in the retainer's groove.

12. The apparatus of claim 9 wherein the retainer comprises a chamfer on an outer edge of the retainer configured to facilitate placement of the retainer in a counterbore.

13. An apparatus for sealing an axial flow path defining axial directions, the apparatus comprising:
a ring shaped retainer having a retainer outer diameter (OD) and a retainer inner diameter (ID), the inner diameter being stepped to define a groove in an inner surface of the retainer, the groove diameter being larger than the retainer ID and smaller than the retainer OD;
a ring shaped seal comprising:
top and bottom surfaces configured to be compressed when in a sealing configuration,
a stepped outer diameter between the top and bottom surfaces with a first outer diameter being smaller than a second diameter, wherein the second diameter is larger than the retainer ID and smaller than the groove diameter,
a plurality of bores defined in the first outer diameter, the plurality of bores sufficient to effect resiliency in the seal in response to compression of the seal on the top and bottom surfaces;
wherein the groove in the inner surface of the ring shaped retainer defines top and bottom axially opposing surfaces extending between the retainer ID and the groove diameter, the top and bottom axially opposing surfaces disposed such that a portion of the ring shaped seal having the second diameter is disposed between the top and bottom axially opposing surfaces when the ring shaped seal is placed within the ring shaped retainer, wherein the top and bottom axially opposing surfaces limit axial movement of the ring shaped seal in both axial directions;
wherein the first outer diameter is less than the retainer ID and defines an axial extension portion of the ring shaped seal extending axially past one of the top and bottom axially opposing surfaces of the groove in the inner surface of the ring shaped retainer when the ring shaped seal is placed within the ring shaped retainer.

14. The apparatus of claim 13 wherein the retainer comprises a retainer outer surface having a first outer diameter and a second outer diameter with the first outer diameter being smaller than the second outer diameter.

15. The apparatus of claim 13 wherein the retainer comprises a chamfer on an inner edge of the retainer configured to facilitate placement of the seal in the retainer's groove.

16. The apparatus of claim 13 wherein the retainer comprises a chamfer on an outer edge of the retainer configured to facilitate placement of the retainer in a counterbore.

17. An apparatus for sealing an axial flow path defining axial directions, the apparatus comprising:
a ring shaped retainer having a retainer outer diameter (OD) and a retainer inner diameter (ID), the inner diameter being stepped to define a groove in an inner surface of the retainer, the groove diameter being larger than the retainer ID and smaller than the retainer OD;
a ring shaped seal comprising:
top and bottom surfaces configured to be compressed when in a sealing configuration,
a stepped outer diameter between the top and bottom surfaces with a first outer diameter being smaller than the second diameter, wherein the second diameter is larger than the retainer ID and smaller than the groove diameter,
a plurality of bores defined in at least two rows in one or both of the first outer diameter and the second outer diameter, the plurality of bores sufficient to effect resiliency in the seal in response to compression of the seal on the top and bottom surfaces;
wherein the groove in the inner surface of the ring shaped retainer defines top and bottom axially opposing surfaces extending between the retainer ID and the groove diameter, the top and bottom axially opposing surfaces disposed such that a portion of the ring shaped seal having the second diameter is disposed between the top and bottom axially opposing surfaces when the ring shaped seal is placed within the ring shaped retainer, wherein the top and bottom axially opposing surfaces limit axial movement of the ring shaped seal in both axial directions;
wherein the first outer diameter is less than the retainer ID and defines an axial extension portion of the ring shaped seal extending axially past one of the top and bottom axially opposing surfaces of the groove in the inner surface of the ring shaped retainer when the ring shaped seal is placed within the ring shaped retainer.

18. The apparatus of claim 17 wherein the retainer comprises a retainer outer surface having a first outer diameter and a second outer diameter with the first outer diameter being smaller than the second outer diameter.

19. The apparatus of claim 17 wherein the retainer comprises a chamfer on an inner edge of the retainer configured to facilitate placement of the seal in the retainer's groove.

20. The apparatus of claim 17 wherein the retainer comprises a chamfer on an outer edge of the retainer configured to facilitate placement of the retainer in a counterbore.

21. An apparatus for sealing an axial flow path defining axial directions, the apparatus comprising:
a ring shaped retainer comprising:
a retainer outer surface having a first outer diameter and a second outer diameter with the first outer diameter being smaller than the second outer diameter,
a retainer inner diameter (ID), the inner diameter being stepped to define a groove in an inner surface of the retainer inside and opposite of the retainer outer surface's second outer diameter, the groove diameter being larger than the retainer ID and smaller than the second outer diameter;
a ring shaped seal comprising:
top and bottom surfaces configured to be compressed when in a sealing configuration,
a stepped outer diameter between the top and bottom surfaces with a first outer diameter being smaller than the second diameter, wherein the second diameter is larger than the retainer ID and smaller than the groove diameter,
a groove between the first outer diameter and the second outer diameter sufficient to effect resiliency in the seal in response to compression of the seal on the top and bottom surfaces;
wherein the groove in the inner surface of the ring shaped retainer defines top and bottom axially opposing surfaces extending between the retainer ID and the groove diameter, the top and bottom axially opposing surfaces disposed such that a portion of the ring shaped seal having the second diameter is disposed between the top and bottom axially opposing surfaces when the ring shaped seal is placed within the ring shaped retainer, wherein the top and bottom axially opposing surfaces limit axial movement of the ring shaped seal in both axial directions;
wherein when the ring shaped seal is placed within the ring shaped retainer the ring shaped seal floats within the ring shaped retainer.

22. The apparatus of claim 21 wherein the retainer comprises a chamfer on an inner edge of the retainer configured to facilitate placement of the seal in the retainer's groove.

23. The apparatus of claim 21 wherein the retainer comprises a chamfer on an outer edge of the retainer configured to facilitate placement of the retainer in a counterbore.

24. An apparatus for sealing an axial flow path defining axial directions, the apparatus comprising:
a ring shaped retainer comprising:
a retainer outer surface having a first outer diameter and a second outer diameter with the first outer diameter being smaller than the second outer diameter,
a retainer inner diameter (ID), the inner diameter being stepped to define a groove in an inner surface of the retainer inside and opposite of the retainer outer surface's second outer diameter, the groove diameter being larger than the retainer ID and smaller than the second outer diameter;
a ring shaped seal comprising:
top and bottom surfaces configured to be compressed when in a sealing configuration,
a stepped outer diameter between the top and bottom surfaces with a first outer diameter being smaller than the second diameter, wherein the second diameter is larger than the retainer ID and smaller than the groove diameter,
a plurality of bores defined in at least two rows in one or both of the first outer diameter and the second outer diameter, the plurality of bores sufficient to effect resiliency in the seal in response to compression of the seal on the top and bottom surfaces;
wherein the groove in the inner surface of the ring shaped retainer defines top and bottom axially opposing surfaces extending between the retainer ID and the groove diameter, the top and bottom axially opposing surfaces disposed such that a portion of the ring shaped seal having the second diameter is disposed between the top and bottom axially opposing surfaces when the ring shaped seal is placed within the ring shaped retainer, wherein the top and bottom axially opposing surfaces limit axial movement of the ring shaped seal in both axial directions;
wherein when the ring shaped seal is placed within the ring shaped retainer the ring shaped seal floats within the ring shaped retainer.

25. The apparatus of claim 24 wherein the retainer comprises a chamfer on an inner edge of the retainer configured to facilitate placement of the seal in the retainer's groove.

26. The apparatus of claim 24 wherein the retainer comprises a chamfer on an outer edge of the retainer configured to facilitate placement of the retainer in a counterbore.

27. An apparatus for sealing an axial flow path defining axial directions, the apparatus comprising:
a ring shaped retainer having a retainer outer diameter (OD) and a retainer inner diameter (ID), the inner diameter being stepped to define a groove in an inner surface of the retainer, the groove diameter being larger than the retainer ID and smaller than the retainer OD;
a ring shaped seal comprising:
top and bottom surfaces configured to be compressed when in a sealing configuration,
a stepped outer diameter between the top and bottom surfaces with a first outer diameter being smaller than the second diameter, wherein the second diameter is larger than the retainer ID and smaller than the groove diameter;
wherein the groove in the inner surface of the ring shaped retainer defines top and bottom axially opposing surfaces extending between the retainer ID and the groove diameter, the top and bottom axially opposing surfaces disposed such that a portion of the ring shaped seal having the second diameter is disposed between the top and bottom axially opposing surfaces when the ring shaped seal is placed within the ring shaped retainer, wherein the top and bottom axially opposing surfaces limit axial movement of the ring shaped seal in both axial directions;
wherein when the ring shaped seal is placed within the ring shaped retainer the ring shaped seal floats within the ring shaped retainer.

28. The apparatus of claim 27 wherein the retainer comprises a retainer outer surface having a first outer diameter and a second outer diameter with the first outer diameter being smaller than the second outer diameter.

29. The apparatus of claim 27 wherein the retainer comprises a chamfer on an inner edge of the retainer configured to facilitate placement of the seal in the retainer's groove.

30. The apparatus of claim 27 wherein the retainer comprises a chamfer on an outer edge of the retainer configured to facilitate placement of the retainer in a counterbore.

31. An apparatus for sealing an axial flow path defining axial directions, the apparatus comprising:
    a ring shaped retainer comprising:
        a retainer outer surface having a first outer diameter and a second outer diameter with the first outer diameter being smaller than the second outer diameter,
        a retainer inner diameter (ID), the inner diameter being stepped to define a groove in an inner surface of the retainer inside and opposite of the retainer outer surface's second outer diameter, the groove diameter being larger than the retainer ID and smaller than the second outer diameter;
    a ring shaped seal comprising:
        top and bottom surfaces configured to be compressed when in a sealing configuration,
        a stepped outer diameter between the top and bottom surfaces with a first outer diameter being smaller than the second diameter, wherein the second diameter is larger than the retainer ID and smaller than the groove diameter;
    wherein the groove in the inner surface of the ring shaped retainer defines top and bottom axially opposing surfaces extending between the retainer ID and the groove diameter, the top and bottom axially opposing surfaces disposed such that a portion of the ring shaped seal having the second diameter is disposed between the top and bottom axially opposing surfaces when the ring shaped seal is placed within the ring shaped retainer, wherein the top and bottom axially opposing surfaces limit axial movement of the ring shaped seal in both axial directions;
    wherein the first outer diameter is less than the retainer ID and defines an axial extension portion of the ring shaped seal extending axially past one of the top and bottom axially opposing surfaces of the groove in the inner surface of the ring shaped retainer when the ring shaped seal is placed within the ring shaped retainer.

32. The apparatus of claim 31 wherein the retainer comprises a chamfer on an inner edge of the retainer configured to facilitate placement of the seal in the retainer's groove.

33. The apparatus of claim 31 wherein the retainer comprises a chamfer on an outer edge of the retainer configured to facilitate placement of the retainer in a counterbore.

34. An apparatus for sealing an axial flow path, the apparatus comprising:
    a ring shaped seal comprising:
        top and bottom surfaces configured to be compressed when in a sealing configuration,
        a stepped outer diameter between the top and bottom surfaces with a first outer diameter being smaller than the second diameter;
    a ring shaped retainer defining an inner groove configured to retain at least a portion of the ring shaped seal, the ring shaped retainer defining:
        an annular extension portion extending axially beyond the inner groove, and
        a chamfer on an outer edge of an axial most end of the ring shaped retainer axially opposite of the annular extension portion, the chamfer configured to engage an edge of a counterbore to facilitate insertion into the counterbore;
    wherein when the ring shaped seal is placed within the ring shaped retainer the ring shaped seal floats within the ring shaped retainer.

35. An apparatus for sealing an axial flow path defining axial directions, the apparatus comprising:
    a ring shaped retainer comprising:
        a retainer outer surface having a first outer diameter and a second outer diameter with the first outer diameter being smaller than the second outer diameter,
        a retainer inner diameter (ID), the inner diameter being stepped to define a groove in an inner surface of the retainer inside and opposite of the retainer outer surface's second outer diameter, the groove diameter being larger than the retainer ID and smaller than the second outer diameter;
    a ring shaped seal comprising:
        top and bottom surfaces configured to be compressed when in a sealing configuration,
        a stepped outer diameter between the top and bottom surfaces with a first outer diameter being smaller than the second diameter, wherein the second diameter is larger than the retainer ID and smaller than the groove diameter,
        a groove between the first outer diameter and the second outer diameter sufficient to effect resiliency in the seal in response to compression of the seal on the top and bottom surfaces;
    wherein the groove in the inner surface of the ring shaped retainer defines top and bottom axially opposing surfaces extending between the retainer ID and the groove diameter, the top and bottom axially opposing surfaces disposed such that a portion of the ring shaped seal having the second diameter is disposed between the top and bottom axially opposing surfaces when the ring shaped seal is placed within the ring shaped retainer, wherein the top and bottom axially opposing surfaces limit axial movement of the ring shaped seal in both axial directions;
    wherein the first outer diameter is less than the retainer ID and defines an axial extension portion of the ring shaped seal extending axially past one of the top and bottom axially opposing surfaces of the groove in the inner surface of the ring shaped retainer when the ring shaped seal is placed within the ring shaped retainer.

36. The apparatus of claim 35 wherein the retainer comprises a chamfer on an inner edge of the retainer configured to facilitate placement of the seal in the retainer's groove.

37. The apparatus of claim 35 wherein the retainer comprises a chamfer on an outer edge of the retainer configured to facilitate placement of the retainer in a counterbore.

38. The apparatus of claim 35 wherein the seal comprises a chamfer on an outer edge of the seal configured to facilitate placement of the seal in the retainer.

39. The apparatus of claim 35 wherein the first outer diameter of the retainer defines a step radially inward from the first outer diameter to a third outer diameter that is smaller than the first outer diameter, wherein the step is configured to facilitate engagement with a member to extract the second outer diameter from a counterbore.

40. The apparatus of claim 35 wherein the retainer defines at least one slit.

41. The apparatus of claim 40 wherein the at least one slit is defined only in the second outer diameter of the retainer.

42. An apparatus for sealing an axial flow path defining axial directions, the apparatus comprising:
a substantially annular retainer comprising:
a retainer outer surface having a first outer diameter and a second outer diameter with the first outer diameter being smaller than the second outer diameter, wherein the second outer diameter is configured to engage an inner surface of a counterbore,
a retainer inner diameter (ID), the inner diameter being stepped to define a groove in an inner surface of the retainer inside and opposite of the retainer outer surface's second outer diameter, the groove diameter being larger than the retainer ID and smaller than the second outer diameter,
wherein the groove defines top and bottom axially opposing surfaces extending between the retainer ID and the groove diameter,
wherein the retainer outer surface comprises:
a third outer diameter disposed between the first outer diameter and the second outer diameter and that is smaller than the first outer diameter and the second outer diameter;
a step radially inward from the first outer diameter to the third outer diameter, wherein the step is configured to facilitate engagement with a member to extract the second outer diameter from the counterbore;
a ring shaped seal comprising:
top and bottom surfaces configured to be compressed when in a sealing configuration,
an outer diameter sized to be supported in the groove of the retainer,
wherein the top and bottom axially opposing surfaces are disposed such that a portion of the outer diameter of the ring shaped seal is disposed between the top and bottom axially opposing surfaces when the ring shaped seal is placed within the ring shaped retainer, wherein the top and bottom axially opposing surfaces limit axial movement of the ring shaped seal in both axial directions;
wherein when the ring shaped seal is placed within the ring shaped retainer the ring shaped seal floats within the ring shaped retainer.

43. A method of assembling a ring-shaped retainer having at least one slot and a ring seal, the method comprising:
engaging the ring seal against a chamfer on an inside edge of the retainer to spread the retainer along a slit configured to allow the retainer to open during insertion of the ring seal past the chamfer, the slit comprising a break in a circumferential continuity of the retainer defining opposing end surfaces that spread apart from each other during the insertion of the ring seal past the chamfer;
sliding the seal into proximity with a retainer groove on an inside portion of the retainer;
relaxing the retainer at least partially when the seal ring is in the groove such that the retainer in a relaxed state surrounds the ring seal without clamping the ring seal such that the ring seal floats within the retainer.

44. The method of claim 43 further comprising:
squeezing the retainer with the seal retained in the groove;
positioning the squeezed retainer relative to a counterbore;
releasing the retainer to effect placement of the retainer in the counterbore.

\* \* \* \* \*